United States Patent
Anglade

[15] 3,657,789
[45] Apr. 25, 1972

[54] APPARATUS FOR PREPARING A MICROELEMENT FOR SOLDERING

[72] Inventor: Francis Anglade, Levallois-Perret, France

[22] Filed: June 16, 1970

[21] Appl. No.: 48,901

Related U.S. Application Data

[63] Continuation of Ser. No. 760,146, Sept. 17, 1968, abandoned.

[30] Foreign Application Priority Data

Mar. 29, 1968 France....................................146510
Mar. 29, 1968 France....................................146511

[52] U.S. Cl. ..........................................29/203 D, 29/203 P
[51] Int. Cl............................................................H01r 43/04
[58] Field of Search ..............29/203 R, 203 P, 203 D; 228/6

[56] References Cited

UNITED STATES PATENTS

| | | |
|---|---|---|
| 3,051,026 | 8/1962 | Da Costa....................................228/6 |
| 3,102,331 | 9/1963 | Da Costa...................................29/203 |
| 3,439,520 | 4/1969 | Schwartz................................29/203 X |

Primary Examiner—Thomas H. Eager
Attorney—Lane, Aiken, Dunner & Ziems

[57] ABSTRACT

Apparatus for preparing the conductors projecting from a flat-pack for soldering comprises an anvil supporting the conductors and a soldering wire transversely of the conductors, a reciprocable plunger mounted above the anvil for exerting a predetermined pressure against a soldering wire placed transversely over the conductors, and cooperating side walls of the plunger and the anvil forming a scissors for severing the soldering wire upon downward movement of the plunger.

10 Claims, 3 Drawing Figures

PATENTED APR 25 1972 3,657,789

INVENTOR:
FRANCIS ANGLADE
BY Kurt Kelman
AGENT

APPARATUS FOR PREPARING A MICROELEMENT FOR SOLDERING

This application is a continuation of Ser. No. 760,146, filed Sept. 17, 1968, now abandoned.

BACKGROUND AND SUMMARY OF THE INVENTION

The present invention relates to soldering electronic micro-elements. It is concerned with an apparatus for preparing such micro-elements for soldering elements.

Various soldering procedures for electrical micro-elements have been proposed but they depend either on the skill of the operator in a very time-consuming manual operation, are quite wasteful in case of occasional failures, or are applicable only to certain structures.

In view of the shortcomings of such procedures and also because the elements to be soldered are very fragile and sensitive to high temperatures, it is preferred to use electrically heated soldering irons. However, in this case, it is necessary to provide a sufficient, predetermined amount of solder upon which the soldering irons act to provide a good mechanical and electrical connection between the soldered parts.

It is accordingly an object of the present invention to prepare an electrical micro-element for soldering by a soldering iron with a sufficient amount of uniformly distributed solder to assure such a connection without raising the temperature of the soldering iron to a damaging degree.

It is another object of the invention to provide simple and effective apparatus for such preparation and for soldering the prepared element.

The above and other objects are accomplished in accordance with this invention with an electronic micro-element which comprises a plurality of conductors projecting from the element in one direction and in a single plane, and a soldering wire or rod including a core of fluxing material extending across the conductors in a direction transverse to the one direction, the wire or rod and the conductors forming a mechanical bond at their respective points of intersection.

According to the invention, such an element is prepared by placing the spaced conductors, which are disposed in a single plane, with the conductors extending in one direction, on a flat support to maintain them in this plane. A soldering wire or rod is delivered from a supply across the conductors in a direction transverse to the one direction, and the wire or rod is placed over the conductors. Pressure is then applied against the soldering wire or rod in a direction perpendicular to the plane until the wire or rod has been somewhat flattened and has been pressed into the conductors whereby the wire or rod and the conductors form a mechanical bond at their respective points of intersection. The wire or rod is severed from the supply while the pressure is applied thereagainst, then the pressure is lifted to leave the soldering wire or rod connected to the conductors.

The apparatus for carrying out this method comprises an anvil member having a flat upper surface supporting the spaced conductors in their plane. A ledge at one end of the anvil member defines a groove extending in a direction substantially transverse to the one direction and capable of receiving the soldering wire or rod. A plunger is mounted above the flat upper surface of the anvil member and is vertically reciprocable in relation thereto, the plunger having a lower flat surface facing the upper surface of the anvil member and substantially parallel thereto. Means, for instance fluid pressure, is provided for exerting a predetermined downward pressure on the plunger against the soldering wire or rod placed transversely over the conductors through the groove, and cooperating side walls of the plunger and anvil member ledge form a scissors upon downward movement of the plunger for severing the soldering wire or rod placed over the conductors through the groove.

BRIEF DESCRIPTION OF DRAWING

The above and other objects, advantages and features of the present invention will become more apparent by reference to the following detailed description of a preferred embodiment thereof, taken in conjunction with the accompanying drawing wherein.

DETAILED DESCRIPTION

Figure 1:
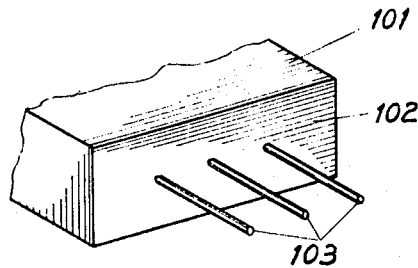
FIG. 1 is a perspective view of one end of a flat-pack from which project the electrical connecting conductors to be soldered to a circuit.

Referring first to FIG. 1, the element to be soldered is constituted by a sealed casing 101 enclosing a plurality of electronic micro-elements. A plurality of leads or electrical connecting conductors 103 project from lateral wall 102 of the casing, the conductors being arranged in one plane and leading from respective electronic micro-elements sealed within the casing to be connected by soldering to a printed circuit, for instance. The leads are equidistantly arranged, have been cut to a predetermined length, and are polished to form a perfectly plane surface.

Figure 2:
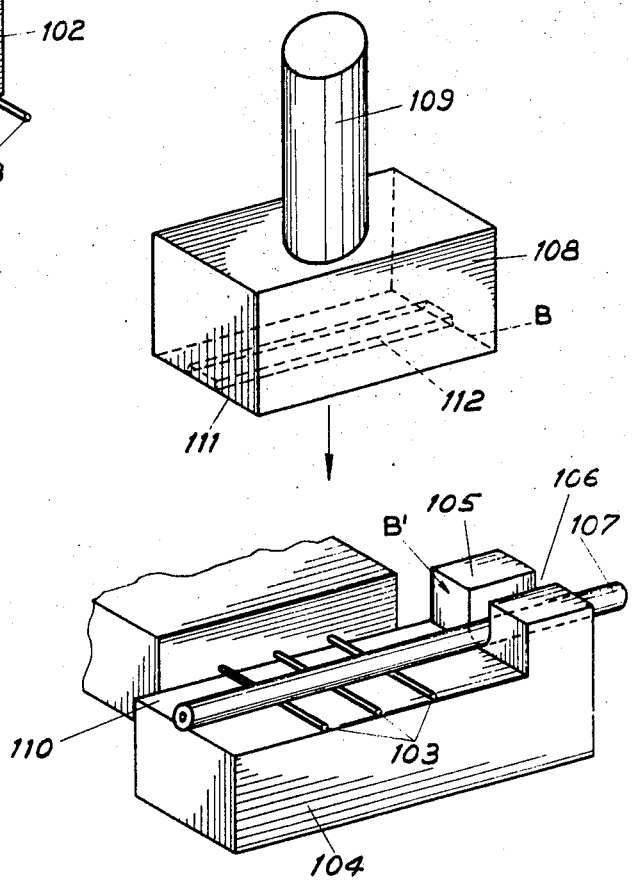
FIG. 2 is a schematic perspective view of an apparatus of this invention.

The manner of uniting a soldering wire or rod 107 with the conductors 103 is shown in FIG. 2.

The casing 101 is placed with its lateral wall 102 adjacent an anvil 104 so that its plane upper surface 110 supports the conductors 103. A ledge 105 extends upwardly from the anvil at one side thereof, the ledge defining a groove 106 arranged to receive the soldering wire or rod 107 extending longitudinally of the anvil transversely across and above the plane surface of the conductors 103. A vertically movable plunger 108 is mounted above the anvil 104 and has a lower surface 111 cooperating with the upper surface 110 of the anvil when the plunger is depressed by means of piston rod 109 which may be fluid-pressure operated.

The two surfaces 110 and 111 are perfectly plane and parallel to each other. In the illustrated embodiment, plunger surface 111 defines a shallow, longitudinally extending recess 112 arranged to engage the soldering rod or wire 107 and thus to limit the flattening thereof when the plunger is move against the anvil. Provision of such a recess is not essential, however, and could be replaced, for instance, by a suitably arranged limiting stop to limit the maximal downward movement of the plunger.

As will be obvious from a consideration of FIG. 2, the end wall B of the plunger will cooperate with the inside wall B' of anvil ledge 105 to provide a scissors for severing the soldering rod or wire 107 while it is flattened and set on he conductors 103.

Figure 3:
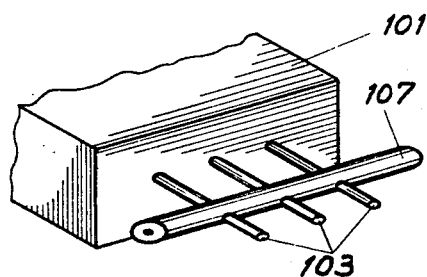
FIG. 3 is a view similar to that of FIG. 1, showing a soldering wire connected with the conductors by means of the apparatus of FIG. 2.

The operation of the apparatus of FIG. 2 for making the element 101 ready for soldering in the manner shown in FIG. 3 will be obvious from the above description.

First, the casing 101 is placed adjacent the anvil 104 so that the side wall 102 abuts one of the side walls of the anvil, and the conductors 103, which lie in a perfect plane, are supported on surface 110 of the anvil. The soldering wire or rod 107 is then advanced from a source of supply (not shown) through the groove 106 of anvil ledge 105 until its leading end extends beyond the outermost conductor 103 by a predetermined length designed to produce a good soldering union. The plunger is now depressed under a predetermined pressure until it presses against the soldering wire or rod and flattens the same while setting the conductors in the soldering wire or rod in the manner shown in FIG. 3. At the same time, the soldering wire or rod is severed by the cooperating action of walls B and B'.

What is claimed is:

1. An apparatus for preparing one or more electrical leads for soldering, said apparatus comprising a first forming member adapted to support said leads along with a supply of solder material in contact with said leads, a second forming member normally disposed in spaced relation to said first forming member, and means to press said forming members together to form a bond between said solder material and said leads, one of said forming members having means for limiting the flattening of said solder material during the pressing together of said forming members.

2. The apparatus of claim 1 wherein said solder material is in the form of a strip, and wherein said means for limiting the flattening of said solder material is in the form of a recess formed in said one forming member and adapted to receive a portion of said strip, the cross-sectional area of said recess being less than that of said strip.

3. The apparatus of claim 1 wherein said solder material is in the form of a strip, and wherein said first forming member comprises means for positioning said strip so that it extends in a generally transverse direction with respect to said leads.

4. The apparatus of claim 3 wherein said means for positioning said strip is in the form of a recess-defining means disposed adjacent the support surface of said first forming member.

5. The apparatus of claim 4 wherein said solder material is in the form of a continuous strip connected to a source of solder material, a portion of said second forming member being adapted to cooperate with said recess-defining means for severing said strip from said source during said pressing together of said forming members.

6. The apparatus of claim 1 wherein said solder material is in the form of a continuous strip connected to a source of solder material, and further comprising cooperating means on said forming members for severing said strip from said source during said pressing together of said forming members.

7. An apparatus for preparing one or more electrical leads for soldering, said apparatus comprising a first forming member adapted to support said leads along with a strip of solder material connected to a supply thereof, a second forming member normally disposed in spaced relation to said first forming member, means to press together said forming members to form a bond between said solder material and said leads, and cooperating means formed on said forming members for severing said strip from said supply during the pressing together of said forming members.

8. The apparatus of claim 7 wherein said first forming member comprises means for positioning said strip of solder material so that it extends in a generally transverse direction with respect to said leads.

9. An apparatus for preparing for soldering a plurality of spaced conductors projecting from an electronic micro-element in one direction and in one plane, comprising
   1. an anvil member having a flat upper surface supporting the spaced conductors in said plane,
      a. a ledge at one end of the anvil member defining a groove extending in a direction substantially transverse to the one direction and capable of receiving a soldering wire or rod;
   2. a plunger mounted above the flat upper surface of the anvil member and vertically reciprocable in relation thereto,
      b. the plunger having a lower flat surface facing the upper surface of the anvil member and substantially parallel thereto;
   3. means for exerting a predetermined downward pressure on the plunger against a soldering wire or rod placed transversely over the conductors through said groove; and
   4. cooperating side walls of the plunger and of the anvil member ledge forming a scissors upon downward movement of the plunger for severing the soldering wire or rod placed over the conductors through the groove.

10. The apparatus of claim 9 wherein the lower surface of the plunger defines a shallow groove extending in said transverse direction in alignment with said groove, the depth of the groove being less than the diameter of the soldering wire or rod.

* * * * *